United States Patent [19]

Kitzing

[11] 3,878,171

[45] Apr. 15, 1975

[54] PROCESS FOR CROSSLINKING HYDROPHILIC COLLOIDS USING UNSATURATED ALDEHYDES CONTAINING N-HETEROCYCLIC RINGS

[75] Inventor: Rainer Kitzing, Villars sur Glane, Switzerland

[73] Assignee: Ciba-Geigy AG, Basel, Switzerland

[22] Filed: Feb. 26, 1973

[21] Appl. No.: 335,604

[30] Foreign Application Priority Data
Feb. 29, 1972 Switzerland.......................... 2867/72

[52] U.S. Cl.................... 260/73 R; 96/111; 96/114; 96/114.8; 260/117
[51] Int. Cl....... C08f 27/18; C08h 1/06; C09h 7/00
[58] Field of Search............................ 260/73 R, 117

[56] References Cited
UNITED STATES PATENTS
3,792,021   2/1974   Tschopp et al................. 260/117 X OTHER PUBLICATIONS
Chem. Abstracts, Vol. 76, 1972, Tschopp et al.

Primary Examiner—Howard E. Schain
Attorney, Agent, or Firm—Joseph G. Kolodny; Edward McC. Roberts; Prabodh I. Almaula

[57] ABSTRACT

This invention relates to a process for crosslinking hydrophilic colloids, e.g., gelatine. The crosslinking agent corresponds to the formula $X_1-CR_1=CH-Y_1$. $R_1$ represents a hydrogen atom or an organic substituent, $X_1$ represents a heterocyclic radical bound to $=CH-$ by means of nitrogen and $Y_1$ denotes an aldehyde group or a functionally modified aldehyde group.

9 Claims, No Drawings

PROCESS FOR CROSSLINKING HYDROPHILIC COLLOIDS USING UNSATURATED ALDEHYDES CONTAINING N-HETEROCYCLIC RINGS

The subject of the invention is a process for crosslinking hydrophilic colloids which contain amino, imino and/or hydroxyl groups. According to this process, the crosslinking agents used are compounds which correspond to the formula $$X_1-\underset{R_1}{C}=CH-Y_1 \qquad (1)$$

wherein $R_1$ denotes a hydrogen atom, an alkyl group, a cycloalkyl radical, an aralkyl radical, an aryl radical or a heterocyclic radical, $X_1$ denotes a heterocyclic radical bonded to the $-CR_1=CH-$ group by means of a ring nitrogen atom and $Y_1$ denotes an optionally functionally modified aldehyde group.

By the compounds of the formula (1) having a functionally modified aldehyde group there are to be understood those functional derivatives of the aldehydes which can either react directly with the hydrophilic colloid, producing crosslinking, or which liberate the aldehyde in an aqueous medium. Such functional derivatives are, for example, the oximes, semi-acetals, acetals, acylals, azomethines and bisulphite adducts and especially the hydrates. The manufacture and splitting of aldehyde derivatives is described in detail in "Houben Weyl, Methoden der organischen Chemie," 4th edition 1954, volume 7/1, pages 413 to 487.

Preferred crosslinking agents correspond to the formula $$X_1-\underset{R_2}{C}=CH-Y_1 \qquad (2)$$

or of the formula $$X_1-CH=CH-Y_1 \qquad (3)$$

wherein $X_1$ and $Y_1$ have the indicated meaning and $R_2$ denotes a hydrogen atom or an alkyl group with at most 4 carbon atoms, for example an ethyl group.

The aldehydes and aldehyde-hydrates of the formulae $$X_1-CH=CH-Y_2 \qquad (4)$$

and $$X_2-CH=CH-Y_2 \qquad (5)$$

are of particular interest. Here, $X_1$ again has the indicated meaning, $X_2$ denotes a heterocyclic radical which is bonded to the $-CH=CH-$ group by a nitrogen atom of a five-membered hetero-ring which contains 2 to 4 ring nitrogen atoms and 3 to 1 carbon atoms, and $Y_2$ denotes an aldehyde or aldehyde-hydrate group.

Particularly advantageous results are also achieved with the aldehydes and aldehyde derivatives of the formula $$X_3-\underset{R_1}{C}=CH-Y_1 \qquad (6)$$

wherein $R_1$ and $Y_1$ have the indicated meaning and $X_3$ denotes a monocyclic pyrazole or imidazole radical bonded by a ring nitrogen atom to the $-CR_1=CH-$ group, and amongst these the compounds of the formula $$X_3-CH=CH-Y_2 \qquad (7)$$

should be singled out.

Finally, particularly valuable crosslinking agents to be mentioned are the compounds of the formula

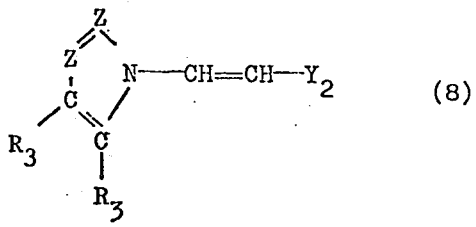

$$(8)$$

wherein $Y_2$ has the indicated meaning, one Z represents a nitrogen atom and the other Z represents a

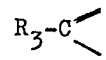

group, and of the total of three $R_3$ which are present at least one denotes a hydrogen atom and the remainder denote hydrogen atoms or methyl groups. Thus, these are pyrazole or imidazole compounds which in addition to the substituent $-CH=CH-Y_2$ do not contain any further substituents or contain one or two methyl groups.

The compounds of the formulae (1) to (8) to be used according to the invention, of which some are in themselves known, can appropriately be manufactured by adding a propinal of the formula $$R_1-C\equiv C-C\underset{\diagdown O}{\diagup H} \qquad (9)$$

onto a nitrogen compound of the formula $$X_1-H \qquad (10)$$

wherein $R_1$ denotes a hydrogen atom, an alkyl group, a cycloalkyl radical, an aralkyl radical, an aryl radical or a heterocyclic radical and $X_1$ denotes a heterocyclic radical bonded to the hydrogen atom by a ring nitrogen atom, for example

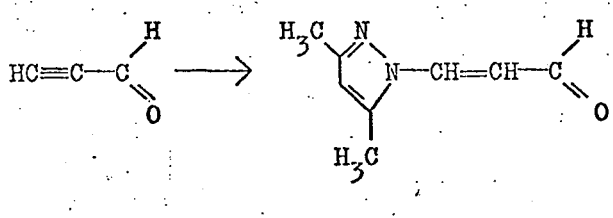

(11)      (12)      (22)

and thereafter, if appropriate, converting the aldehyde group into a functionally modified aldehyde group.

The addition reaction is advantageously carried out in an organic solvent, if appropriate at elevated temperature. As examples of suitable solvents there may be mentioned acetone, tetrahydrofurane, chloroform, methylene chloride, benzene, acetic acid and also water. The course and the end of the reaction can easily be followed by thin layer chromatography. The addition products thus obtained can be purified in the usual manner by recrystallisation, reprecipitation, sublimation, distillation or chromatography.

As starting for the addition reaction it is possible to use, for example, on the one hand (9) propinal, 3-ethylpropinal or 3-phenylpropinal and on the other (10) aziridine, piperidine, morpholine, piperazine, pyrrolidine, imidazoles such as unsubstituted imidazole, 2-methylimidazole, 4-methylimidazole, 2-ethylimidazole, 2,4-dimethylimidazole, 2-ethyl-4-methylimidazole, 4,5-dimethylimidazole, 2,4,5-trimethylimidazole and benzimidazole, pyrazoles such as unsubstituted pyrazole, 2,5-dimethylpyrazole, 2-methyl-5-phenylpyrazole, 5-phenylpyrazole or 2-hydroxymethylpyrazole and also triazoles such as 1,2,4-triazole and benzotriazole, and tetrazoles such as unsubstituted tetrazole and 5-methyltetrazole, 5-ethyltetrazole, 5-propyltetrazole, 5-phenyltetrazole and 5-cyclohexyltetrazole.

The crosslinking agents of the formulae (1) to (8) can be used in the textile and leather industry, the manufacture of paper and the plastics, glue and gelatine industry. Above all, their use as hardeners for water-soluble polymers such as polyvinyl alcohol, gelatine or gelatine derivatives, especially in the form of layers, containing such colloids, in photographic materials. The reaction of these colloids with these compounds in general takes place easily and in the usual manner. The compounds are as a rule sufficiently water-soluble.

In most cases it suffices to add the products to be used according to the invention, as an aqueous solution or in a solid form which is as finely divided as possible, to an aqueous solution of the hydrophilic colloid, whilst stirring well.

It is thus possible, for example, to bring together a solution of the crosslinking agent in water, or in a mixture with, for example, ethanol, methanol or acetone, and the colloids, at normal or slightly elevated temperature. Hereupon, the crosslinking takes place rapidly and progressively. Gelatine, which optionally contains silver halide and/or other materials for the production of photographic images has here proved particularly suitable. It is possible in the usual manner to cast the gelatine onto a base to form a layer, and to dry it. The layer can then be left at elevated temperature for a certain time, for example up to 24 hours, or at room temperature. Hereupon, hardening takes place rapidly and progressively; the melting point of the gelatine is raised substantially, for example by 25° to 60°C, and the reciprocal swelling factor increases correspondingly (compare Table II).

The amount of the hardener used depends on the desired degree of hardening but is appropriately 0.1 to 10 per cent by weight relative to the weight of dry gelatine.

A particular advantage of the present crosslinking agents is that even when used in low concentration they impart a sufficient degree of hardness to the gelatine layers rapidly, for example after 3 hours, so that the castings can be tested, by processing of samples, immediately following manufacture, even at elevated temperature or in chemically aggressive processing baths.

It is furthermore an advantage that during hardening according to the invention with the compounds of the formula (1), no significant change in pH in the emulsion layer occurs.

The hardening effect itself is very stable; even after prolonged storage at temperatures of about 40°C and a relative atmospheric humidity of about 70 percent the reciprocal swelling factor remains above 0.2.

The degree of hardening is also not changed substantially by acids or bases even on prolonged exposure, which indicates that the hardener-gelatine bond is very resistant to hydrolysis. Furthermore, the crosslinking agents to be used according to the invention cause no yellowing of the gelatine.

The compounds of the formulae (1) to (8) are furthermore generally sufficiently easily soluble in water and are stable in aqueous solution. The sufficient stability and solubility are both important properties which, for example, decisively influence the utilisability in photographic technology. Thus, for example, it is particularly desirable for the continuous manufacture of photographic materials that batches of crosslinking agents should remain stable at room temperature for several hours or days and that the concentration of the hardener for gelatine, and hence its ability to produce crosslinking, should not decline or only decline insignificantly. On the other hand it is equally important that, for the same reason, the hardener should not decompose or only decompose to an insignificant extent, in the casting solution at about 40°C during the requisite stand time and dwell time, so as to maintain its full crosslinking action for several hours when casting, drying and storing the photographic material.

Furthermore, the viscosity of the casting solution should not increase significantly during the stand time as a result of the addition of the hardener. It is furthermore particularly important that even on prolonged treatment of the cast layer at elevated temperature and atmospheric humidity the hardener should not cause any yellowing or fogging or influence the gradation.

The hardeners are suitable for hardening (crosslinking) the most diverse layers containing gelatine such as, for example, intermediate layers, emulsion layers, base layers, top layers, backing layers and anti-halation layers. The layers can not only contain the crosslinking agents but also additives of the most diverse kind such as, for example, silver halide, pigments, such as barium sulphate, titanium dioxide, silicon dioxide or pigments of organic nature, such as coloured pigments, as well as image dyestuffs, colour coupling agents, sensitisers, filter dyestuffs, anti-halation dyestuffs and screening dyestuffs, stabilisers, UV-absorbers, optical brighteners and/or other crosslinking agents.

In the case of the compounds of relatively small molecular weight it is possible, because of the ease of diffusion in a multi-layer material, to add them only to the auxiliary layers in order to achieve a hardening of the adjacent silver halide layers by diffusion. However, with increasing molecular weight comparable compounds show decreasing diffusion when used in photographic layers. In the manufacture of multi-layer materials, this properly offers decisive advantages in various respects.

These new crosslinking agents can also be used mixed with other compounds suitable for crosslinking water-soluble colloids, especially gelatine.

Manufacturing Instructions 4.8 g (0.05 mol) of 3,5-dimethylpyrazole and 4.2 g (0.078 mol) of propinal are dissolved in 50 ml of absolute acetone. The solution is warmed and kept for 3 hours under reflux at the boil. After being allowed to cool, the solvent is filtered off and the residue (about 7.6 g) is recrystallised from benzine with addition of active charcoal and is dried. About 4.1 g (55% of theory) of 3-[3′,5′-pyrazolyl-(1)]-propinal of the formula (22), of melting point 73° to 74°C, are obtained.

In the same manner it is possible to manufacture, from the nitrogen compounds indicated in column 2 of Table I below, and propinal, the other aldehydes of the formulae listed in column 3. The melting points (MP) or boiling points (BP) can be seen from column 4 and the nuclear resonance data (recorded with a VARIAN A 60 A-instrument with tetramethylsilane (TMS) as the internal standard, $\delta = 0$ ppm) can be seen from column 5. In the compounds of the formulae (27), (28) and (31), the position of the —CH=CH—CHO radical has not been determined.

TABLE I

| 1 No. | 2 Starting substance | 3 Reaction product | 4 MP-BP | 5 Nuclear resonance data (DMSO - $d_6$) | | | | |
|---|---|---|---|---|---|---|---|---|
| | | | | Chemical shift $\delta$ | | | Coupling constant | |
| | | | | $H_\alpha$ | $H_\beta$ | $H_\gamma$ | $\alpha/\beta$ Hz | $\beta/\gamma$ Hz |
| (21) | Pyrazole | [pyrazole-N—CH=CH—CHO] | MP 66-68°C | 9.67 | 6.63 | 8.35 | 8 | 14 |
| (22) | 3,5-Dimethyl-pyrazole | [3,5-dimethylpyrazole-N—CH=CH—CHO] | MP 73-74°C | 9.60 | 6.37 | 8.1 | 8 | 13.5 |
| (23) | Imidazole | [imidazole-N—CH=CH—CHO] | MP 114°C | 9.60 | 6.65 | 8.25 | 7.5 | 14.5 |
| (24) | 2-Methylimidazole | [2-methylimidazole-N—CH=CH—CHO] | MP 124°C | 9.64 | 6.65 | 8.15 | 8 | 14 |
| (25) | Benzimidazole | [benzimidazole-N—CH=CH—CHO] | MP 194-197°C | 9.66 | 6.80 | 8.52 | 7.5 | 14 |
| (26) | Benztriazole | [benztriazole-N—CH=CH—CHO] | MP 147-148°C | 9.85 | 7.05 | 9.00 | 8 | 14 |
| (27) | Ethyltetrazole | [ethyltetrazole with CH=CH—CHO] | MP.O.2 80-82°C | 9.88 | 6.86 | 8.85 | 7.5 | 14 |
| (28) | Phenyltetrazole | [phenyltetrazole with CH=CH—CHO] | MP 109-111°C | 9.88 | 6.85 | 8.97 | 7.5 | 14 |

TABLE I – Continued

| 1 No. | 2 Starting substance | 3 Reaction product | 4 MP-BP | 5 Nuclear resonance data (DMSO - $d_6$) | | | | |
|---|---|---|---|---|---|---|---|---|
| | | | | Chemical shift δ | | | Coupling constant | |
| | | | | $H_\alpha$ | $H_\beta$ | $H_\gamma$ | $\alpha/\beta$ Hz | $\beta/\gamma$ Hz |
| 29 | 4,5,6,7-Tetra-hydroindazole | [structure] N-CH=CH-CHO | MP 104 – 106 | 9.6 | 6.4 | 8.2 | 8 | 14 |
| 30 | Indazole (Benzpyrazole) | [structure] N-CH=CH-CHO | MP 95 | 9.85 | 7.0 | 8.65 | 8 | 14 |
| 31 | Sodium salt of benztriazole-4-sulphonic acid | $HO_3S$-[structure] N-CH=CH-CHO | MP > 250 | 9.85 | 7.0 | 9.1 | 8 | 14 |

EXAMPLE 1

6 ml of 6% strength gelatine solution, 1 ml of 1% strength dyestuff solution, 1 ml of 0.025 molar hardener solution and 5 ml of deionised water are mixed and adjusted to pH = 6.5. The solution is cast on a triacetate film of size 13 cm × 18 cm. After solidification at 10°C, the material is dried at 20°C over the course of 1 hour. The dyestuff mainly serves to make the samples more easily visible during the swelling measurements. Storage takes place under ambient conditions (NS: 20°C, 50% relative atmospheric humidity) or climatic conditions (CS: 43°C, 69% relative atmospheric humidity).

To determine the reciprocal swelling factor, a 20 μ thick section is prepared from the samples and measured under the microscope. First, the thickness of the dry layer is determined, then deionised water is added and after 4 minutes the thickness of the swollen layer is measured. The reciprocal swelling factor 1/SF corresponds to the ratio $$1/SF = \frac{\text{Thickness of the dry layer}}{\text{Thickness of the swollen layer}}$$

The values in Table II were obtained in such measurements.

TABLE II

| Crosslinking agent, see Table I, Formula No. | 1/SF on normal storage after: | | | | | 1/SF on climatically controlled storage after: | | | |
|---|---|---|---|---|---|---|---|---|---|
| | 3 hours | 2 days | 7 days | 14 days | 28 days | 2 days | 7 days | 14 days | 28 days |
| (21) | 0.208 | 0.223 | 0.261 | 0.236 | 0.269 | 0.275 | 0.280 | 0.267 | 0.296 |
| (22) | 0.141 | 0.212 | 0.253 | 0.220 | 0.221 | 0.296 | 0.282 | 0.297 | 0.292 |
| (23) | 0.186 | 0.224 | 0.231 | 0.225 | 0.251 | 0.238 | 0.244 | 0.270 | 0.269 |
| (24) | 0.187 | 0.212 | 0.234 | 0.227 | 0.210 | 0.297 | 0.293 | 0.292 | 0.268 |
| (25)* | 0.244 | 0.258 | 0.223 | — | — | 0.273 | 0.276 | — | — |
| (26)** | 0.085 | 0.122 | 0.126 | 0.121 | 0.134 | 0.175 | 0.172 | 0.185 | 0.195 |
| (27) | 0.063 | 0.095 | 0.103 | 0.107 | 0.130 | 0.145 | 0.181 | 0.178 | 0.250 |
| (28)* | 0.203 | 0.229 | 0.225 | — | — | 0.247 | 0.243 | — | — |
| (29) | 0.067 | 0.120 | 0.136 | — | — | 0.240 | 0.225 | — | — |
| (30) | 0.156 | 0.174 | 0.182 | — | — | 0.226 | 0.227 | — | — |
| (31) | 0.167 | 0.215 | 0.193 | 0.220 | 0.228 | 0.305 | 0.305 | 0.310 | 0.319 |

*Dissolved in dimethylformamide/water, 1:1
**Dissolved in ethanol/water, 1:1

*Dissolved in dimethylformamide/water, 1:1

EXAMPLE 2

6 g of a water-soluble polyvinyl alcohol are dissolved in 100 ml of deionised water by stirring at 50°C for 1 hour. 680 mg (0.5 millimol) of aldehyde of the formula (24) (see Table I) are dissolved in 10 ml of deionised water. 6 ml of the polyvinyl alcohol solution, 4 ml of the aldehyde solution and 2 ml of deionised water are mixed, the pH value is adjusted to 6.5 and the mixture is cast at room temperature onto a substrated glass plate of 13 cm . 18 cm surface area. It is then dried whilst extracting the air from above the layer.

A layer obtained in this manner showed, after storage for 7 days at 43°C and 69% relative atmospheric humidity, a melting range of 61° to 95°C measured in water; a layer which was otherwise identical but manufactured without addition of the crosslinking agent showed a melting range of 20° to 28°C.

EXAMPLE 3

60 ml of 6% strength aqueous gelatine solution are diluted with 5 ml of deionised water. 1 ml of a 25 × $10^{-3}$ molar solution of the hardener is added thereto. The solution is adjusted to pH 6.5 and cast on a triacetate film (13 cm × 18 cm). The film is dried by means of circulating air and is measured in a spectrophotometer (Car 15) after climatically controlled storage (43°C, 69% relative atmospheric humidity). The optical density at 400 nm is determined, a sample without added hardener serving as the reference. High densities denote a higher yellow fogging.

3. Process according to claim 2, which comprises using a crosslinking agent of the formula
$$X_1-CH=CH-Y_1$$
wherein $X_1$ and $Y_1$ have the indicated meaning.

4. Process according to claim 3, which comprises using a crosslinking agent of the formula
$$X_1-CH=CH-Y_2$$
wherein $X_1$ has the indicated meaning and $Y_2$ denotes an aldehyde group or aldehyde-hydrate group.

5. Process according to claim 4, which comprises using a crosslinking agent of the formula
$$X_2-CH=CH-Y_2$$
wherein $Y_2$, has the indicated meaning and $X_2$ denotes a heterocyclic radical which is bonded to the —CH=CH— group by a nitrogen atom of a five-membere hetero-ring containing 2 to 4 ring nitrogen atoms and 3 to 1 carbon atoms.

| Hardener | Storage conditions | Optical density at 400 nm |
|---|---|---|
| 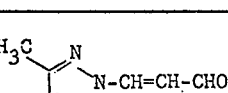 | 7 days climatically controlled conditions | 0.003 |
| 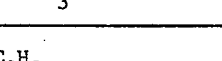 | 7 days climatically controlled conditions | 0.019 |
|  | 7 days climatically controlled conditions | 0.021 |
| 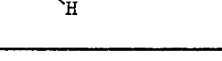 | 7 days climatically controlled conditions | 0.016 |

Compound 22 shows a considerably lesser yellow fogging than the comparison compounds.

We claim:

1. Process for crosslinking a hydrophilic colloid which contains amino, imino and/or hydroxyl groups, which process comprises using a crosslinking agent of the formula

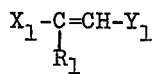

wherein $R_1$ denotes a hydrogen atom, an alkyl group, a cycloalkyl radical, an aralkyl radical, an aryl radical or a heterocyclic radical, $X_1$ denotes a heterocyclic radical bonded to the —$CR_1$=CH— group by means of a tertiary ring nitrogen atom of a five-membered heterocyclic ring containing 2 to 4 nitrogen atoms and 3 to 1 carbon atoms and $Y_1$ denotes an aldehyde group or a functionally modified aldehyde group.

2. Process according to claim 1, which comprises using a crosslinking agent of the formula

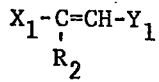

wherein $X_1$ and $Y_1$ have the indicated meaning and $R_2$ denotes a hydrogen atom or an alkyl group with at most 4 carbon atoms.

6. Process according to claim 1, which comprises using a crosslinking agent of the formula $$X_3-\underset{R_1}{C}=CH-Y_1$$

wherein $R_1$ and $Y_1$ have the indicated meaning and $X_3$ denotes a monocyclic pyrazole or imidazole ring bonded to the —$CR_1$=CH— group by a ring nitrogen atom.

7. Process according to claim 6, which comprises using a crosslinking agent of the formula
$$X_3-CH=CH-Y_2$$
wherein $X_3$ and $Y_2$ have the indicated meaning.

8. Process according to claim 7, which comprises using a crosslinking agent of the formula

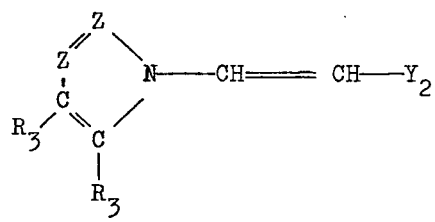

wherein $Y_2$ has the indicated meaning, one Z represents a nitrogen atom and the other Z represents a
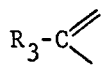
group, and of the total of three $R_3$ which are present at least one denotes a hydrogen atom and the remainder denote hydrogen atoms or methyl groups.
9. Process according to claim 1 which comprises crosslinking polyvinyl alcohol or gelatine.
* * * * *